United States Patent
Compagno et al.

(10) Patent No.: US 10,911,207 B1
(45) Date of Patent: Feb. 2, 2021

(54) REUSABLE ACKNOWLEDGMENTS

(71) Applicant: Cisco Technology, Inc., San Jose, CA (US)

(72) Inventors: Alberto Compagno, Issy les Moulineaux (FR); Michele Papalini, Issy les Moulineaux (FR); Luca Muscariello, Paris (FR); Giovanna Carofiglio, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/721,717

(22) Filed: Dec. 19, 2019

(51) Int. Cl.
*G06F 15/173* (2006.01)
*H04L 5/00* (2006.01)
*H04L 1/18* (2006.01)
*H04L 1/16* (2006.01)
*H04L 12/807* (2013.01)
*H04L 29/06* (2006.01)

(52) U.S. Cl.
CPC .......... *H04L 5/0055* (2013.01); *H04L 1/1664* (2013.01); *H04L 1/189* (2013.01); *H04L 5/0044* (2013.01); *H04L 47/27* (2013.01); *H04L 69/22* (2013.01); *H04L 63/1458* (2013.01); *H04L 2463/142* (2013.01)

(58) Field of Classification Search
CPC ... H04L 47/781; H04L 47/822; H04L 47/824; H04L 63/107; H04L 63/108; H04L 67/1002
See application file for complete search history.

(56) References Cited

U.S. PATENT DOCUMENTS

2007/0217439 A1* 9/2007 Lemaire ............... G06F 15/7867
370/419
2017/0134450 A1* 5/2017 Heinz, II ............ H04L 65/1089

* cited by examiner

*Primary Examiner* — Yves Dalencourt
(74) *Attorney, Agent, or Firm* — Lee & Hayes, P.C.

(57) ABSTRACT

This disclosure describes techniques for employing a reusable acknowledgment in communications among network devices. The techniques include generating a reusable negative acknowledgment (NACK) in response to a request for data that are unavailable. The reusable NACK may be sent as a response for at least some additional requests for unavailable data, rather than generating a new NACK for each request. As such, the reusable NACK may help decrease the computational load for a network device. In some cases, the use of a reusable NACK may help lessen the impacts of denial-of-service type attacks across a network.

20 Claims, 13 Drawing Sheets

US 10,911,207 B1

REUSABLE ACKNOWLEDGMENTS

TECHNICAL FIELD

The present disclosure relates generally to generating a reusable acknowledgment for network communications, thereby improving performance of the network.

BACKGROUND

In network environments, a user device and a server may be configured to exchange communications with each other. The user device may request data from the server, for example. In some instances, the server may not be able to provide the requested data to the user device. The server may respond to the request by sending a negative acknowledgment (NACK) to the user device. Generation of a NACK may consume resources at the server. For instance, the server may compute a signature for any given NACK. The signature may allow a user device to confirm that the NACK came from the server. However, repeated requests to the server may overrun the resources of the server to produce and sign NACKs in a timely manner. Further, a malicious device may exploit this weakness by using repeated requests for unavailable data as a basis of an attack on a server. Therefore, network operations may benefit from a more efficient method of responding to requests for data that are unavailable.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIGS. 1A-2A, 2C, and 2E illustrate component diagrams with example environment in which reusable acknowledgments may be employed as part of communications between network devices, in accordance with the present concepts.

DESCRIPTION OF EXAMPLE EMBODIMENTS

Overview

Figure 1A:
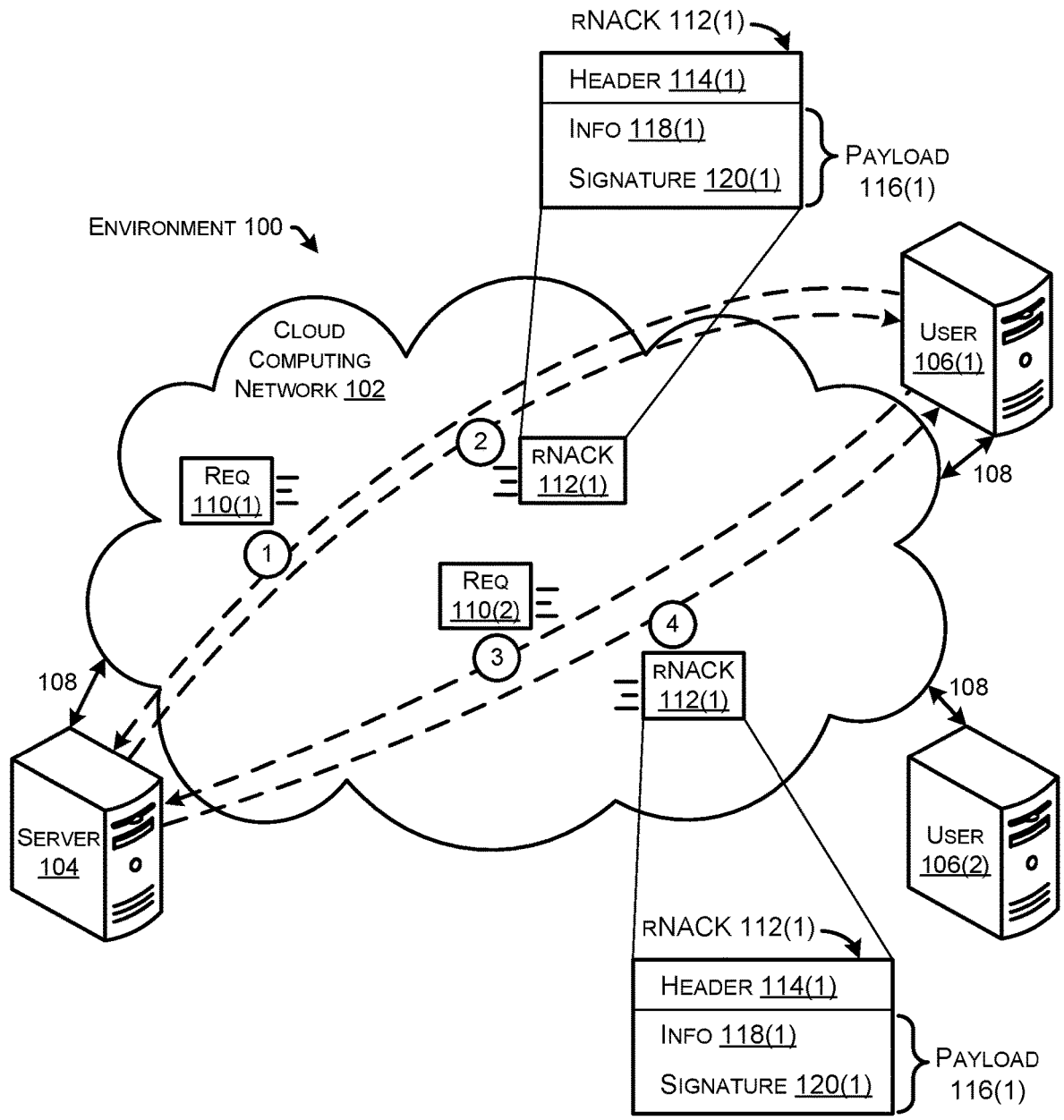

This disclosure describes a method that may be implemented by a server device communicatively coupled to a first user device and a second user device. The method may include receiving, from the first user device, a first request relating to data produced by the server device. The method may include determining that the first request corresponds to a portion of the data that is currently unavailable for providing to the first user device. In response to the data being unavailable, the method may include generating a payload based at least in part on the first request, signing the payload, generating a reusable negative acknowledgment (NACK) comprising at least the signed payload and a header, and sending the reusable NACK with the header to the first user device. Further, the method may include receiving, from the second user device, a second request relating to the data produced by the server device. The method may include determining that the signed payload of the reusable NACK is applicable to the second request, and modifying the header of the reusable NACK based at least in part on the second request. Also, the method may include sending the reusable NACK with the modified header to the second user device.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for generating a reusable acknowledgment for use in network communication. For example, a server may receive a request for data from a user device. However, the data that are requested by the user device may be unavailable for the server to provide to the user device. Therefore, in response, the server may send a negative acknowledgment (NACK) to the user device. To improve network communications and/or conserve computing resources, the server may generate a reusable NACK. In this manner, the server may be able to respond to future requests for unavailable data by simply reusing the NACK, rather than having to generate a new NACK for each request for unavailable data.

As used herein, a server device (e.g., producer) and a user device (e.g., client device, consumer) may be network devices configured to exchange communications (e.g., packets) via a network connection. The network connection may be a transport control protocol (TCP) network connection or any network connection (e.g., Cisco information-centric networking (ICN)) that enables the networks devices to exchange packets with each other. For example, the user device may be a computer, laptop, mobile device, tablet, etc., and the server device may be a network device that is configured to provide data and/or network services to the user device. The server device may or may not be a producer, a point of generation and/or origination of the data. For instance, the data may originate elsewhere for the server device to be able to provide to the user device. Alternatively or additionally, the data may pass through other network devices (e.g., router, switch) on a path from the server device to the user device.

In general, acknowledgments may be used in transport protocol (e.g., TCP, ICN, hICN) to coordinate network devices when moving data between them. A NACK may be a regular transport protocol data packet that informs a user device that requested data are not available. In some cases, data packets in transport protocol, including NACKs, may be signed by the server device. Signing NACKs may help prevent forging by a malicious device. However, depending on the transport protocol, NACK generation can be dynamic, potentially preventing a server device from computing NACKs offline. Therefore, NACK production may be a relatively costly operation for a server device.

Several reasons might lead to the situation in which a user device requests nonexistent and/or unavailable data. For instance, the data may have expired, or may not have been produced yet. The user device may not have been notified yet that the data are not available. In some cases, the data production may be delayed past an expected production time. The server device and/or other producer may be overloaded. In some examples, a system may maintain a window of available (e.g., current) data at the server device (e.g., server side). The system may use NACKs to communicate regarding the window of available data, and/or to let user devices estimate the window of available data. For instance, every time a server device receives a request (e.g., interest) related to data that are out of the window (e.g., the data are too old, the data will be produced in the future, etc.), the server may reply with a NACK. An example implementation of this scheme is realtime information-centric transport protocol (RICTP). However, the complexity of a sliding production window may contribute to the difficulty in NACK production, such as preventing offline NACK generation.

In some cases, an adversary (e.g., malicious device) may exploit NACK generation to perform an attack (e.g., denial of service (DoS) attack, distributed denial of service (DDoS) attack) on the server device. For instance, the adversary may repeatedly ask for unavailable data. The server device may become overloaded by producing NACKs in response to the repeated requests. Ultimately, the server device may be unable to respond to future requests, and/or may be unable to perform other tasks. An additional side effect of an attack on a server device may be disabling an associated router. For example, a router may be coupled to one or more server devices. In an instance where a server device does not reply to a request for data, such as where the server device is under attack, the router may become overloaded. In some cases, unsatisfied requests (i.e., requests that are not yet satisfied by any server device) may be stored by the router, such as in a pending interest table (PIT) of the router. Unsatisfied requests may be removed only upon their expiration, leading to exhaustion of resources of the router. Thus, launching an attack on one or more server devices associated with a router may lead to disabling of the router. In fact, an attack on multiple server devices may eventually overrun multiple routers in a network, amplifying the outcome of the attack.

In some implementations, a reusable NACK may be generated that is applicable to multiple requests for unavailable data. A reusable NACK may lessen the computational load at a server device, since it may not need to produce a new NACK for each request for unavailable data. In some examples, a reusable NACK may apply to multiple user devices sending requests for a data packet(s) not available at the server device. For instance, a reusable NACK may include a constant payload, but a modifiable header. The modifiable header may be adjusted to be applicable to different user devices requesting data that are unavailable. Further, the server may sign the payload of the NACK, but not necessarily the header. In this manner, the signature comprises a reusable feature of the NACK. Also, through the signature the reusable NACK maintains the data-authentication properties of a typical NACK. Stated another way, the reusable NACK may include a reusable, signed payload and a modifiable header, for example. By not having to assemble payloads and/or compute signatures for every NACK, a reusable NACK may significantly reduce the computational load on a server device.

To summarize, a more efficient technique for responding to requests for data that are unavailable may improve network operations. A reusable NACK may help reduce overhead and/or conserve computing resources at any given server device. In some examples, a reusable NACK may be viewed as a lightweight mechanism for improving network operations, featuring both relatively low computational cost and relatively low bandwidth usage. Furthermore, improved efficiency of resource use at the server level may help reduce or even avoid the effects of an attack on the producer. In turn, an advantage of reusable NACKs at the server level may lead to a reduction in the consequences of an attack at the router level.

Although the examples described herein may refer to a service device node as the point of generation of an acknowledgment (e.g., NACK), the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1D collectively illustrate an example environment 100 in accordance with the present reusable acknowledgment concepts. Example environment 100 may include cloud computing network 102 (e.g., network), a server device 104 (e.g., server), and/or user devices 106 (e.g., user(s)). Server device 104 may be communicatively coupled to various other devices, such as user devices 106, via cloud computing network 102. Within the example environment 100, the server device 104, user devices 106, and/or other devices may exchange communications (e.g., packets) via a network connection(s) to cloud computing network 102, indicated by double arrows 108. For instance, network connections 108 may be transport control protocol (TCP) network connections or any network connection (e.g., information-centric networking (ICN)) that enables the server device 104 to exchange packets with other devices via cloud computing network 102. The network connections 108 represent, for example, data paths between the server device 104 and user devices 106. It should be appreciated that the term "network connection" may also be referred to as a "network path." The use of a cloud computing network in this example is not meant to be limiting. Other types of networks are contemplated in accordance with reusable acknowledgment concepts.

FIGS. 1A-1D show several examples of communications between server device 104 and various other network devices. The communications are indicated with dashed, numbered lines. For example, referring to FIG. 1A, at "Step 1," server device 104 may receive a request 110(1) from user device 106(1). Request 110(1) may be a request for data from server device 104. For instance, server device 104 may be a producer of data and user device 106(1) may be a consumer of data produced by server device 104. However, request 110(1) may correspond to data that are unavailable from server device 104. The data may have been produced or otherwise acquired at server device 104 at some point in time, but may have already expired and/or been deleted. Or, the data may not have been produced yet, or may never be produced at server device 104. Regardless, server device 104 may determine that the data are unavailable, and/or that server device 104 is otherwise unable to fulfill request 110(1).

At "Step 2," in some cases, server device 104 may send reusable NACK 112(1) to user device 106(1). Reusable NACK 112(1) may be sent to user device 106(1) to indicate that the data corresponding to request 110(1) are unavailable. In FIG. 1A, inset diagrams of reusable NACK 112(1) are provided to show additional detail. As shown in the inset diagrams, a reusable NACK 112(1) may include a header 114 (e.g., name, ICN name) and/or a payload 116. The payload 116 may include information 118 and a signature 120. A payload 116 with a signature 120 may be referred to as a signed payload. (The components of reusable NACKs will be described in greater detail relative to FIG. 1B, below.)

At "Step 3," server device 104 may receive another request 110(2) from user device 106(1). Here again, the requested data may be unavailable at server device 104. The data referenced in request 110(2) may be the same or different than the data referenced in request 110(1), and/or the data referenced in the requests 110 may have some overlap. Regardless, server device 104 may determine that the data corresponding to request 110(2) are unavailable to be provided to user device 106(1). For instance, server device 104 may determine that the data were deleted, expired, have not been produced, will not be produced, incomplete, etc. Additionally or alternatively, server device 104 may determine that reusable NACK 112(1) is appropriate as a response to request 110(2). For instance, server device 104 may determine that the payload 116(1) of reusable NACK 112(1) applies to request 110(2). The payload 116(1) may include information 118 that describes data that are available for providing to user device 106(1), in contrast to the requested data that are unavailable, for example. Server device 104 may determine that the payload 116(1) and/or reusable NACK 112(1) applies to request 110(2) because the information 118, which was valid for request 110(1), remains valid for request 110(2).

At "Step 4," reusable NACK 112(1) may be returned to user device 106(2). The reusable NACK 112(1) may be sent by server device 104 without further review or modification. Therefore, in the example communications illustrated in FIG. 1A, the header and payload of reusable NACK 112(1) are unchanged in response to requests 110(1) and 110(2). Traditionally, a data producer may need to generate an entirely new NACK to be able to respond to a second request for data. The advantage of a reusable NACK is highlighted in the simple case illustrated in FIG. 1A. In this case, server device 104 was able to reuse a NACK it had already generated, preventing unnecessary expenditure of computational resources. In other cases, a reusable NACK may be modified to fit additional scenarios, but still be considered a reusable NACK, as described below.

Figure 1B:
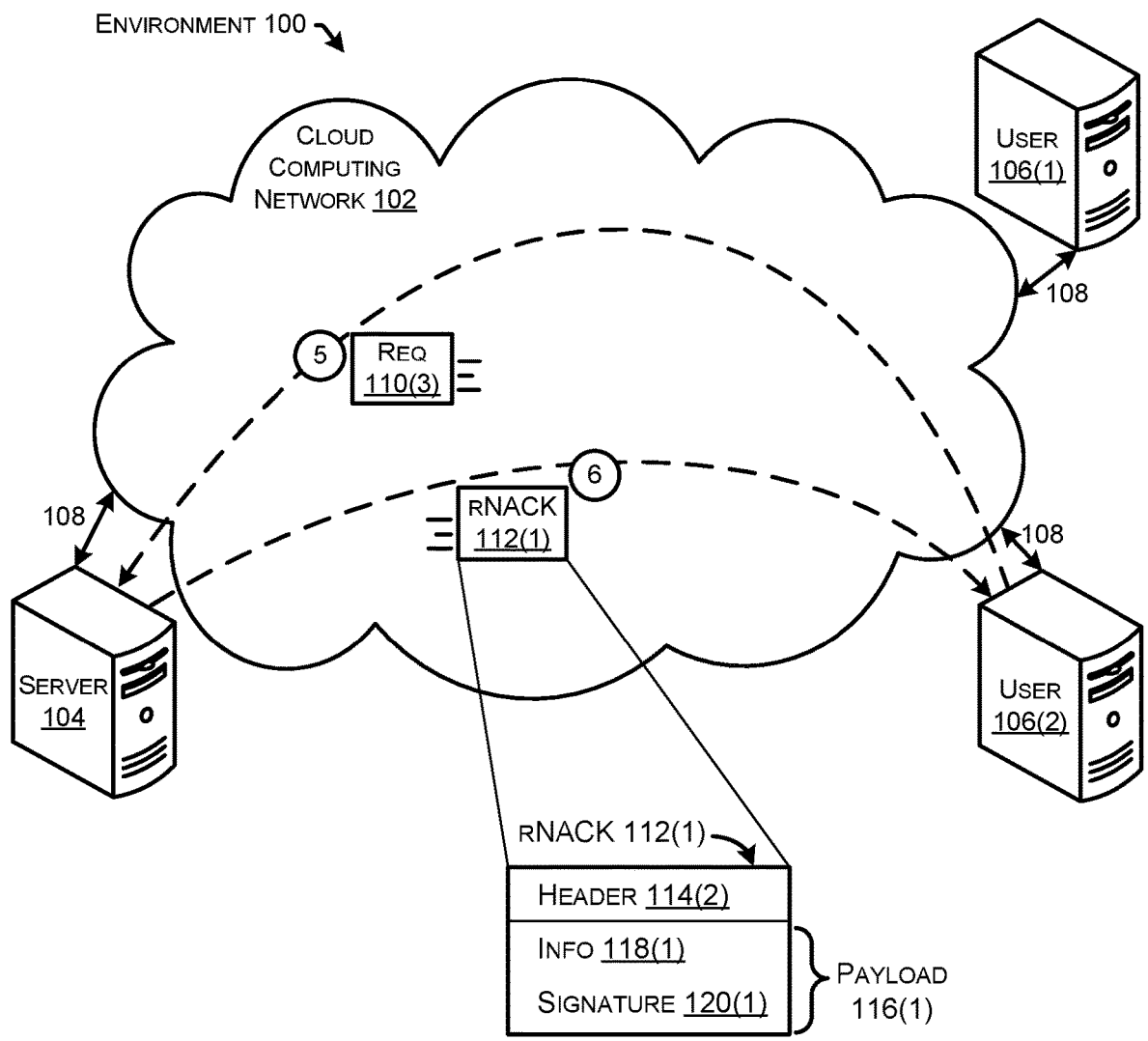

FIG. 1B illustrates additional example communications relative to the example environment 100. Note that communications described in FIGS. 1B-1D may be viewed as continuations of the communications initiated in FIG. 1A, or simply as additional examples of communications that may happen between a server device, such as server device 104, and various other network devices. The particular sequence of events described across FIGS. 1A-1D is not meant to be limiting.

At "Step 5," server device 104 may receive a request 110(3) from user device 106(2). The request 110(3) may reference data that are unavailable at server device 104. The data referenced in request 110(3) may be in whole or part the same or different than the data referenced in requests 110(1) and/or 110(2). Server device 104 may determine that the data corresponding to request 110(3) are unavailable. Additionally or alternatively, server device 104 may determine that reusable NACK 112(1) is appropriate as a response to request 110(3).

In some implementations, a reusable NACK may have a static portion that is not changed or modified. The reusable NACK may also have a dynamic portion that may be changed or modified when the reusable NACK is employed in response to additional requests for data that are unavailable. Designing a reusable NACK with a static portion and a dynamic portion may allow the reusable NACK to be applied in a greater variety of scenarios while still conserving computational resources. In the examples illustrated in FIGS. 1A-1D, the header 114 of the reusable NACK 112 may be a dynamic portion, while the payload 116 of reusable NACK 112 may be a static portion. The header 114 may include an identifier and/or address of server device 104 and/or user device 106. Additionally or alternatively, the header may include an indication of the data packet(s) that was requested, for instance. In some cases, the header 114 and/or contents of the header 114 may have been received with the request 110.

Payload 116 may be a static portion of reusable NACK 112(1). The information 118 of payload 116 may include information related to data that are available (e.g., currently available) from server device 104. Additionally or alternatively, the information 118 may include any information that is not expected to change between a reasonable variety of requests 110 for data to which server device 104 may respond. For instance, the information 118 may be valid for an amount of time, or for a portion of a sequence of data. (The content of reusable NACKs will be described in more detail relative to FIGS. 2A-2F, below.) The signature 120 of payload 116 may be generated by the server device 104, such as by and/or with a key (e.g., private key) of the server device 104. Traditionally, the signature may be applied to the entire NACK—both a header and any additional information in a payload may be "signed." However, in a reusable NACK, such as reusable NACK 112, the signature may only be "signed" relative to information 118, but not to header 114. Applying the signature 120 to information 118 and/or contents of the payload 116, but not to header 114, may allow the payload 116 to be static while the header 114 is dynamic in a reusable NACK. Stated another way, the payload 116 may be the "reusable" portion of the reusable NACK. Note that although the header may not be included under the signature, the header may be viewed as having at least some integrity protection through the content of the payload. For instance, in some implementations the information 118 in the payload 116 may include description of possible requests and/or headers for which the payload 116 can be used as a reply (described in more detail relative to FIG. 2B, below). Thus, an adversary may be prevented from reusing a signed payload for a purpose that does not meet the description included in the payload 116, for example.

In the example illustrated in FIG. 1B, server device 104 may modify the header 114 of reusable NACK 112(1) before responding to request 110(3). For instance, server device 104 may generate a header 114(2) that corresponds to request 110(3). The header 114(2) and/or contents of the header 114(2) may have been received with the request 110(3). In some examples, the header 114(2) may include information related to user device 106(2), such as an identifier and/or an address. Once the header 114(2) is generated and or modified, header 114(2) may be appended to payload 116(1). The modified header 114(2) may be appended without changing the information 118(1) and/or the signature 120(1) of the payload 116(1), for instance.

At Step "6," the reusable NACK 112(1) with the modified header 114(2) may then be sent to user device 106(2). In some examples, modifying a header may be viewed as a relatively minor change. In contrast, modifying information contained in a payload, and/or generating a new signature, may be viewed as a more computationally intensive and/or costly change. For this reason, even though reusable NACK 112(1) shown in FIG. 1B has a modified header as compared to reusable NACK 112(1) sent to user device 106(1) as shown in FIG. 1A, these are considered the same reusable NACK 112(1). Once again, these reusable NACKs 112(1) are considered the same since the reusable portion, the payload 116(1), is unchanged between the examples illustrated in FIGS. 1A and 1B.

Figure 1C:
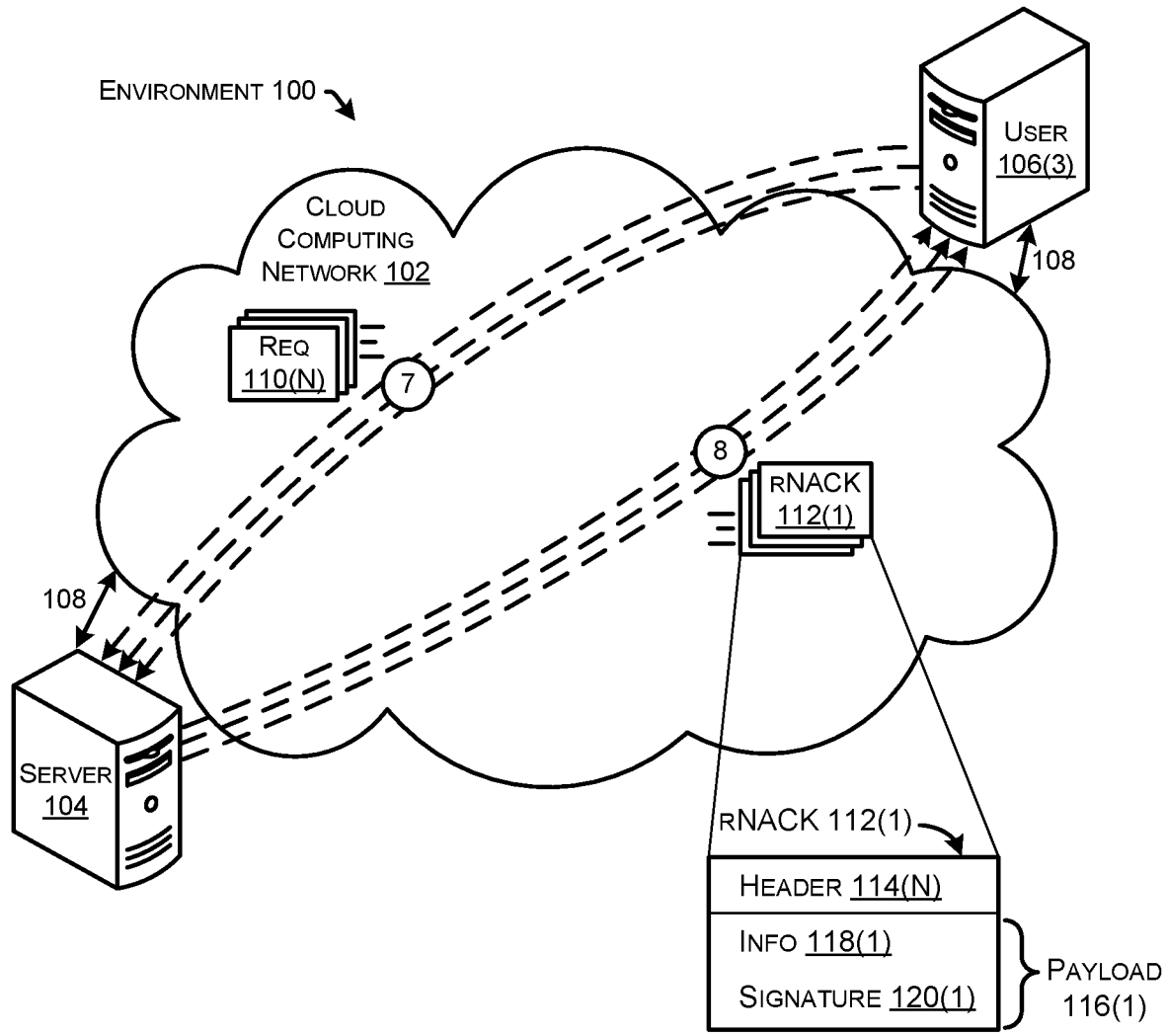

FIG. 1C illustrates additional example communications relative to the example environment 100. In FIG. 1C, "N" represents any number of multiple data requests 110, and a corresponding "N" number of headers 114 generated in response to the additional requests 110. The use of "N" is not meant to be limiting. For instance, the number of requests 110 and the number of headers 114 may not be the same.

At Step "7," user device 106(3) may send multiple requests 110(N) for data to server device 104. Server device 104 may determine that the requests 110(N) reference data that are unavailable at server device 104 for providing to user device 106(3). In some cases, user device 106(3) may represent a malicious actor. For instance, user device 106(3) may intend to launch an attack (e.g., denial of service (DoS) attack, distributed denial of service (DDoS) attack) on server device 104. User device 106(3) may be trying to flood server device 104 with unfillable requests 110 to comprise the ability of server device 104 to respond to legitimate data requests and/or perform other functions. Here, user device 106(3) may represent any type of network device that may launch an attack on another network device. For instance, user device 106(3) may be a producer and/or server-type device. Reusable NACK 112(1) may be useful in this case to help diminish the effect of such an attack. In other cases, user device 106(3) may not necessarily have malicious intent, but may simply be sending multiple requests 110 that may overwhelm the computational resources on server device 104.

At Step "8," server device 104 may reply to any number of the multiple requests 110(N) with reusable NACK 112(1). Rather than having to compute multiple new NACKs for the multiple requests 110, server device 104 is able to handle the flood of requests 110 from user device 106(3) more efficiently by employing the reusable NACK 112(1). Server device 104 may be able to send reusable NACK 112(1) without changing the header 114, or may modify the header for some or all of requests 110(N). In general, although a simple case of one potentially malicious device is presented in FIG. 1C, this case may be expanded to include multiple malicious devices flooding a server device with requests for unavailable data. The case may be expanded even further to include multiple malicious devices flooding a single server device or multiple server devices with such requests. As described above, it is possible to envision an attack eventually overrunning a router, or even multiple routers in a network, amplifying the outcome of the attack.

In some implementations, the use of a reusable NACK by a network device may not prevent an attack on the network device, and/or may not ultimately be able to defeat an attack. At some point the network device may succumb to the attack, becoming too busy and/or disabled. However, a reusable NACK may be able to greatly lessen the impact of such an attack while it is occurring, and/or at least delay the defeat. Just as the attack may be amplified across a network as suggested above, lessening the impact on one device under attack may similarly be expanded to lessening the impact on multiple devices across a network. In this manner, the use of a reusable NACK can significantly improve the overall performance of a network. Furthermore, conservation of network resources through the use of a reusable NACK may allow more efficient functioning of the network in any case, whether or not any particular device is a victim of an attack.

Figure 1D:
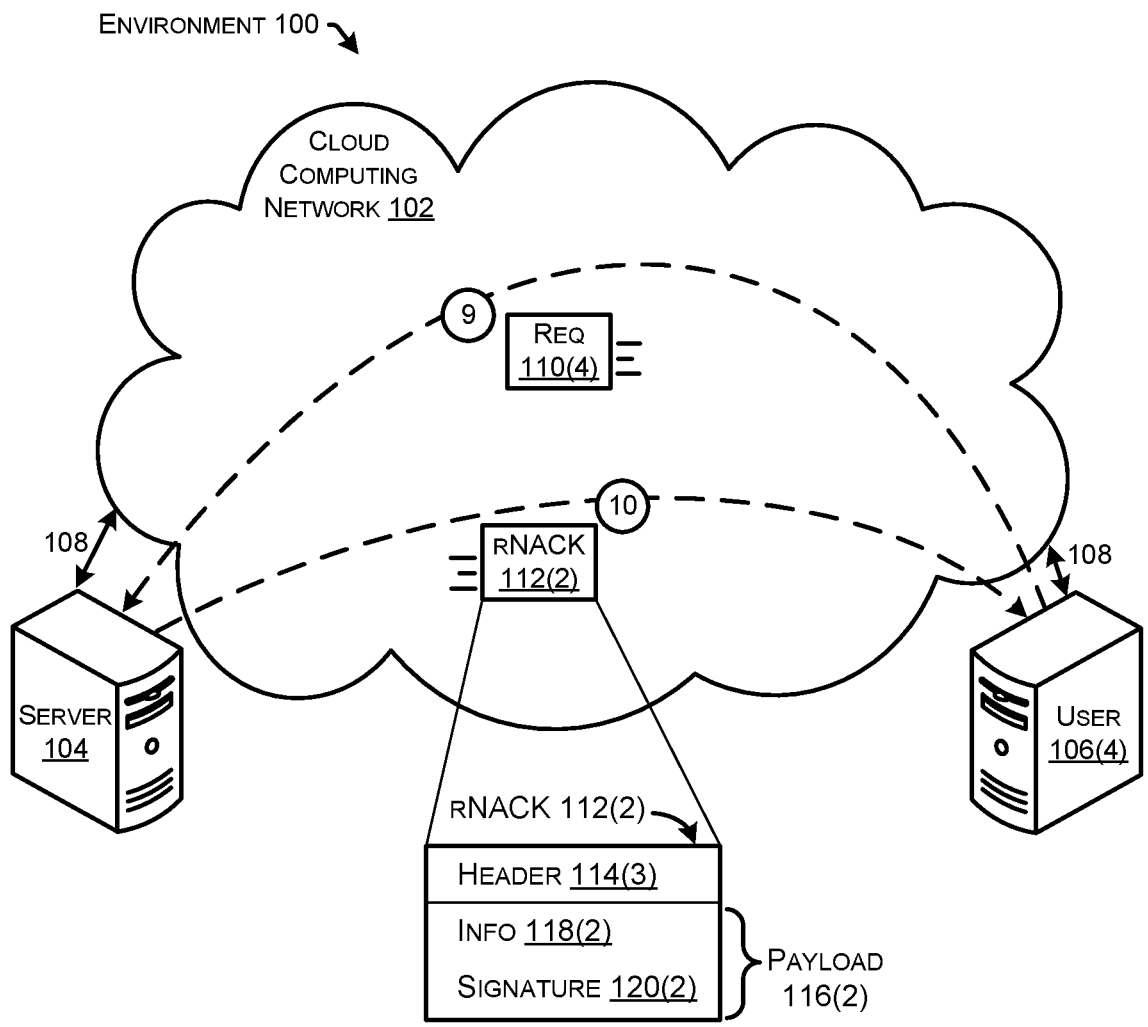

FIG. 1D illustrates additional example communications relative to the example environment 100. In this example, at Step "9," user device 106(4) may send a request 110(4) to server device 104. Server device 104 may determine that data referenced in request 110(4) are unavailable. Server device 104 may evaluate reusable NACK 112(1) (FIG. 1A) as a potential response to request 110(4), but may determine that reusable NACK 112(1) does not apply. For instance, the information 118(1) in reusable NACK 112(1) may have expired. Therefore, server device 104 may determine that a new reusable NACK 112(2) is needed as a response to request 110(4). Server device 104 may generate reusable NACK 112(2) by generating, modifying, and/or updating header 114(3), information 118(2), and signature 120(2).

At Step "10," server device 104 may send the new reusable NACK 112(2) to user 106(4). In some cases, a reusable NACK may apply indefinitely to any requests received by a network device. Or, as illustrated in the example in FIG. 1D, the payload 116 portion of a reusable NACK may eventually need to be changed. In some cases, such as a non-real-time use case scenario, the lifetime of a reusable NACK may be the same as a lifetime of a data packet produced a server device. For instance, the information contained within a reusable NACK may refer to a particular data packet currently being produced at a server device, and the reusable NACK may be valid as long as that packet is being produced. Also, the reusable NACK may be valid independent from a number of requests that may be received for which the data at server device are unavailable.

Therefore, for the entire data packet lifetime, the server device may have to sign only one reusable NACK. In this scenario, when the server device moves to produce a next data packet, a new reusable NACK may be needed. In some cases, a number of signatures for reusable NACKs generated by the server device may match a number of data packets produced. Additional detail regarding the content of the reusable NACK, including scenarios for updating information in the payload and real-time use case scenarios, will now be described relative to FIGS. 2A-2F.

Figure 2A:
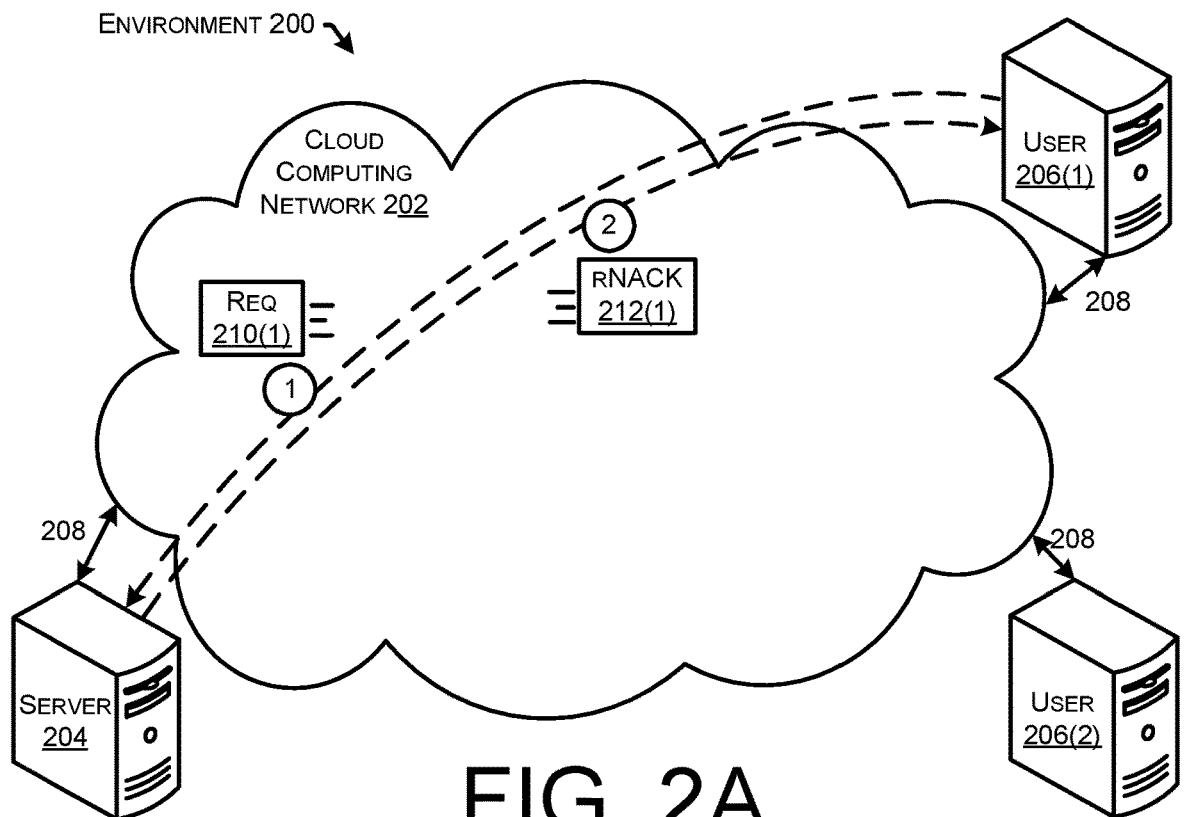
Figure 2B:
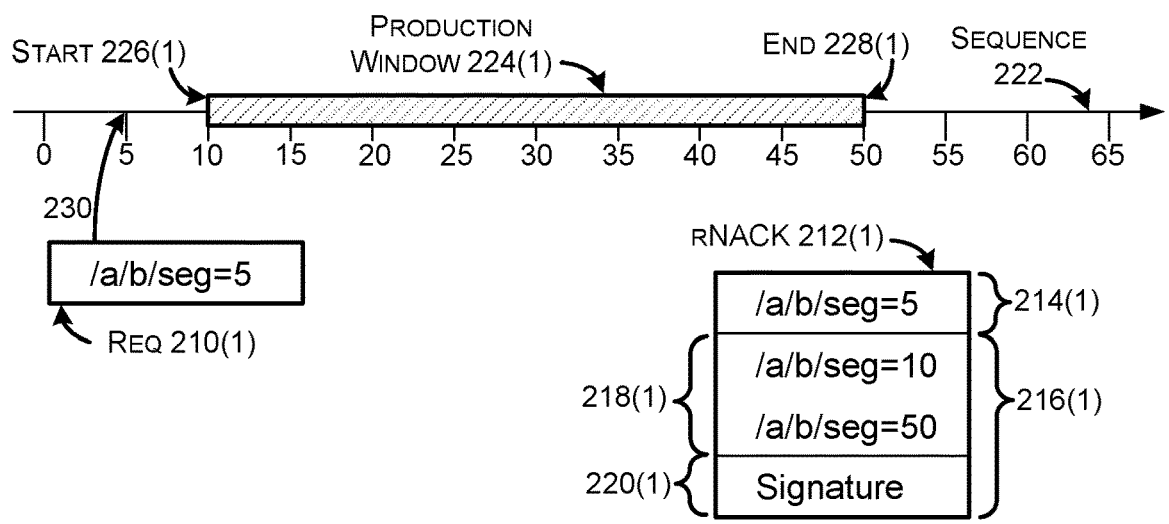
FIGS. 2B, 2D, and 2F illustrate an example production sequence and related example communications that relate to component diagrams illustrated in FIGS. 2A, 2C, and 2E. The example communications, including reusable acknowledgments, may be employed as part of communications between the example network devices illustrated in FIGS. 2A, 2C, and 2E, in accordance with the present concepts.
Figure 2C:
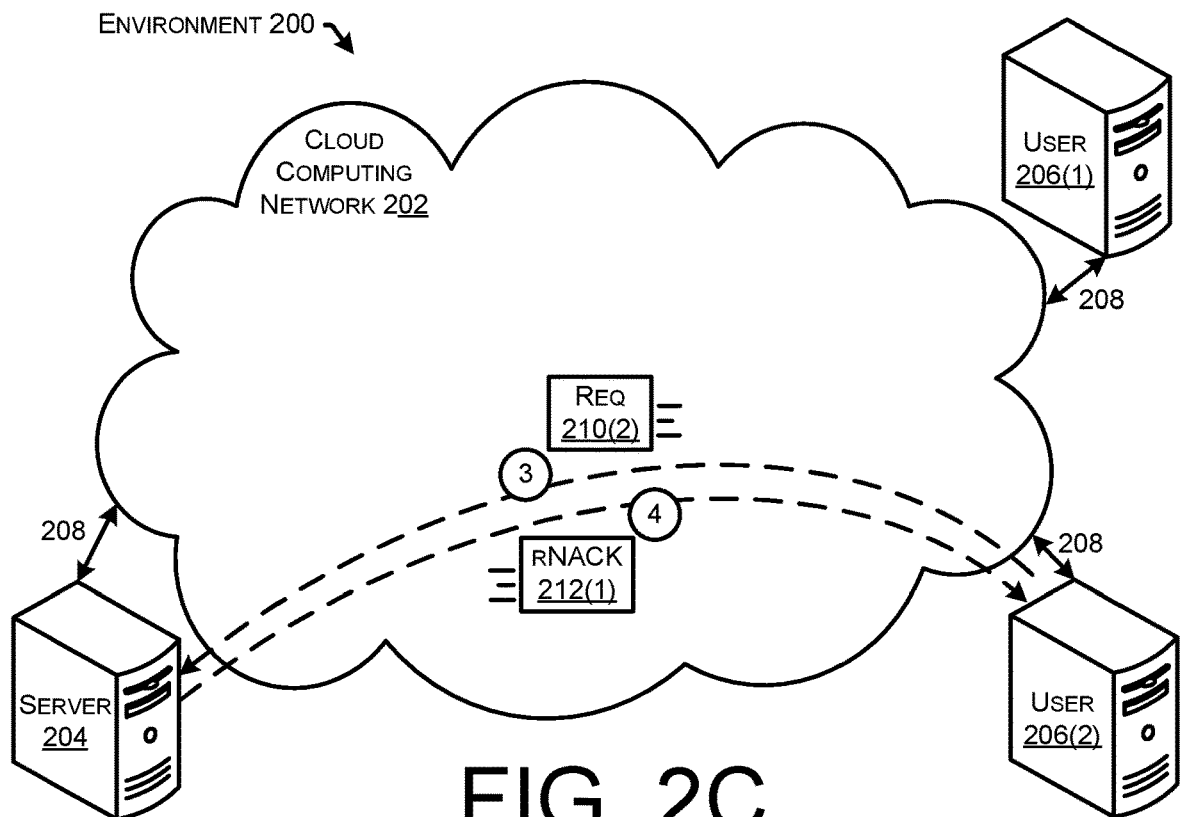
Figure 2D:
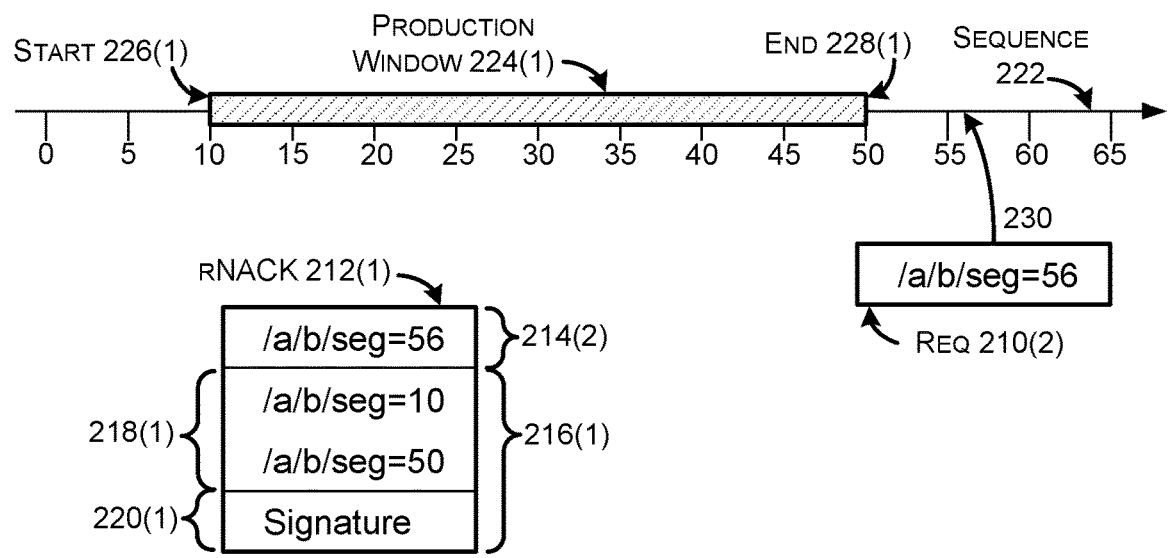
Figure 2E:
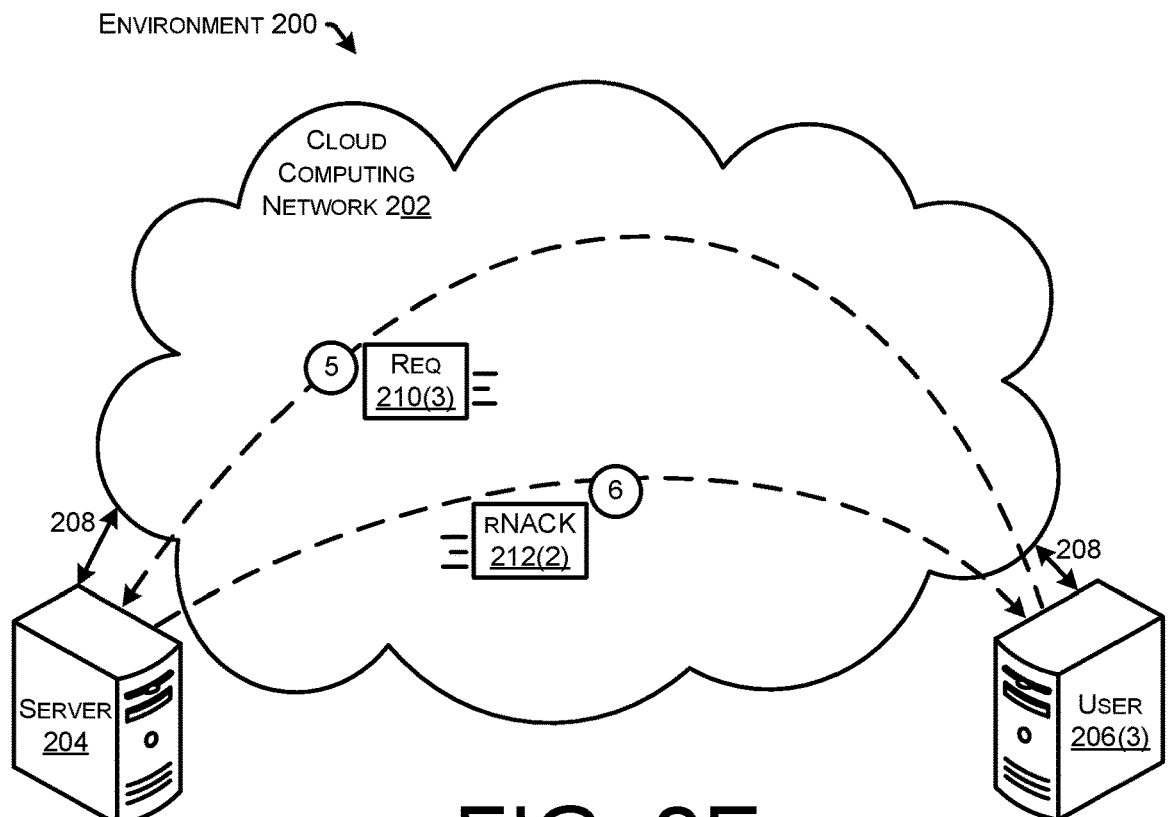
Figure 2F:
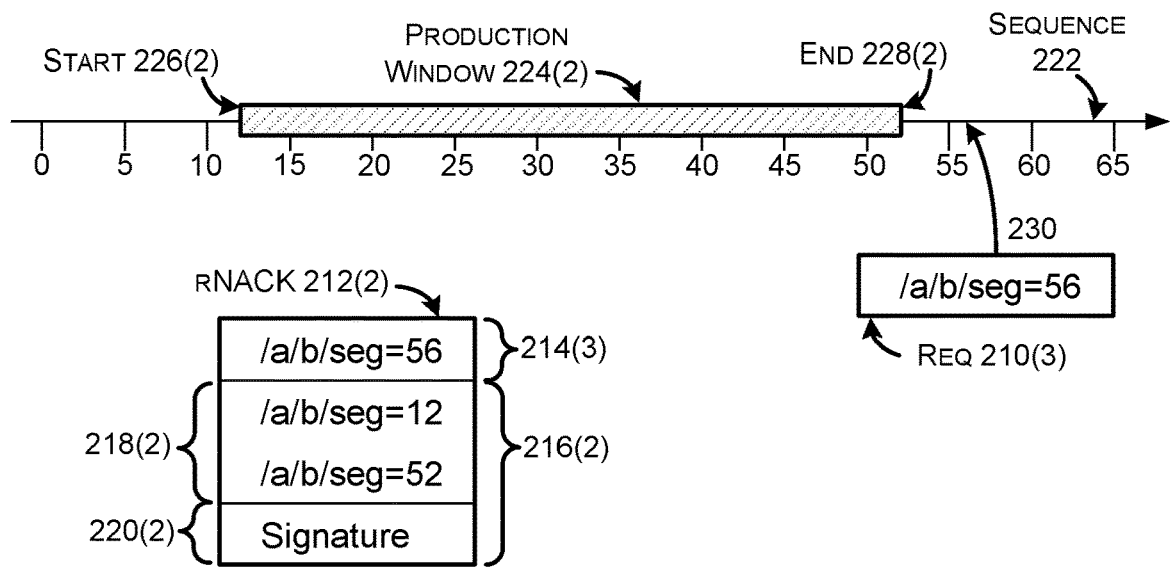

FIGS. 2A-2F collectively illustrate additional example scenarios in accordance with the present reusable acknowledgment concepts. FIGS. 2A, 2C, and 2E illustrate an example environment 200, while FIGS. 2B, 2D, and 2F illustrate example data production and communication concepts that relate to the reusable acknowledgment concepts illustrated in FIGS. 2A, 2C, and 2E. Some aspects of the examples shown in FIGS. 2A-2F may be similar to aspects of the examples described above relative to FIGS. 1A-1D. Therefore, for sake of brevity, not all elements of FIGS. 2A-2F will be described in detail.

As shown in FIGS. 2A, 2C, and 2E, example environment 200 may include cloud computing network 202 (e.g., network), a server device 204 (e.g., server), and/or user devices 206 (e.g., user(s)). Server device 204 may be communicatively coupled to various other devices, such as user devices 206, via cloud computing network 202, indicated by double arrows 208. For instance, network connections 208 may employ information-centric networking (ICN) transport protocol that enables server device 104 to exchange packets with user devices 206 via cloud computing network 102. The example scenarios described relative to FIGS. 2A-2F may also be viewed as pertaining to a "real-time" version of transport protocol, such as real-time information-centric transport protocol (RICTP). Several examples of communications between server device 204 and user devices 206 are illustrated in FIGS. 2A, 2C, and 2E, indicated with dashed, numbered lines. The communications relate to requests 210 for data and/or reusable NACKs 212, in some instances.

FIGS. 2A-2F are arranged in the following corresponding pairs: FIGS. 2A and 2B, FIGS. 2C and 2D, and FIGS. 2E and 2F. For instance, FIG. 2B includes example representations of a request 210(1) and a reusable NACK 212(1) that correspond to the example scenario shown in FIG. 2A. Similar to the examples illustrated in FIGS. 1A-1D, the reusable NACKs 212 in FIGS. 2A-2F may include a header 214 and/or a payload 216. In turn, payload 216 may include information 218 and/or a signature 220. Also included in FIGS. 2B, 2D, and 2F is an example representation of a sequence 222 (e.g., production sequence), which may include a production window 224. Further, the production window 224 may feature a start 226 and/or an end 228.

Some aspects of the example scenario shown in FIG. 2A may be viewed as similar to the example scenario in FIG. 1A. For instance, in FIG. 2A, at "Step 1," server device 204 may receive a request 210(1) from user device 206(1). Request 210(1) may be a request for data from server device 204. In FIG. 2B, an example representation of request 210(1) is depicted as featuring the text string "/a/b/seg=5." In this case "/a/b/seg=5" may represent content of request 210(1). In some cases, a request 210 may include an identifier of network devices associated with the data request. In the example shown in FIG. 2B, "a" may be an identifier of server device 204 and "b" may be an identifier of user device 206(1), or vice versa. In some cases, the identifier may be an address of the network device(s), such as an internet protocol (IP) address. For instance, "a" may represent an IP address of server device 204. Other content for a request 210 is contemplated. For example, a header may include different or alternative content, such as content relevant to a different transport protocol.

The request 210 may also include an indication of the data packet(s) that are being requested. For instance, the text string of request 210(1) includes "seg=5." In this example, "seg=5" may refer to data production relative to sequence 222. As illustrated in FIG. 2B, sequence 222 is an example representation of a production of segments of data. The data production may proceed in chronological order, from zero to segment 65, and beyond. The segment numbering may or may not refer to particular packets of data. In some cases, data production may be viewed as occurring within a production window, such as production window 224(1) shown in FIG. 2B.

Production window 224(1) may be viewed as a group of data (e.g., segments, packets) that are currently being produced by server device 204 in the instance of FIGS. 2A and 2B. Production window 224(1) may have a start 226(1) (e.g., first sequence number), in this case segment 10. Production window 224(1) may also have an end 228(1) (e.g., last sequence number), segment 50. Therefore the current production window 224(1) spans a range of segments 10-50. In some examples, the production window 224(1) may be viewed as starting with the sequence number of a next data packet that will be produced. The production window may have a determinable size (e.g., a number of packets, an amount of time). For instance, a size of the production window may be equal to a production rate multiplied by a lifetime of a request for the data.

Returning to the request 210(1) shown in FIG. 2B, the text string indicates that segment 5 is the data packet being requested. However, segment 5 is outside the current production window 224(1) of segments 10-50, as indicated at arrow 230. In some examples, portions of data that are outside the current production window 224(1) may be unavailable at server device 204. The server device 204 may not have sufficient storage to keep data that were previously produced, for instance. Also, even though these data may have been produced in the past (e.g., earlier in the sequence 222 than a current production window224(1)), they may have since expired and/or been deleted at server device 204. Thus, in the case of FIGS. 2A and 2B, the request 210(1) refers to a portion of data (segment 5) that is currently unavailable to provide to user device 206(1). Server device 204 may make the determination that the data are unavailable based on a comparison of the content of request 210(1) against information regarding the current production window 224(1). For example, server device 204 may recognize that segment 5 is outside the range of segments 10-50 of the current production window 224(1). Stated another way, server device 204 may consider requests for data within the current production window 224(1) to be valid, and other requests to be invalid.

At "Step 2" of FIG. 2A, in some cases, server device 204 may send reusable NACK 212(1) to user device 206(1). Server device 204 may generate reusable NACK 212(1) upon determining that request 210(1) refers to data that are unavailable. Server device 204 may generate reusable NACK 212(1) to be both a response to request 210(1) and also a response to at least some amount of future requests. For instance, header 214(1) of reusable NACK 212(1) may be generated specifically in response to request 210(1). In some cases, as shown in FIG. 2B, a text string associated with response 210(1) may be used as the header 214(1) of reusable NACK 212(1). Further, server device 204 may generate reusable NACK 212(1) to include information 218(1) that may be helpful in response to future requests. In this manner, server device 204 may extend the usefulness of reusable NACK 212(1). For instance, information 218(1) may include an indication of data that are available at server device 204. Information 218(1) may indicate the current production window 224(1) of server device 204. As shown in FIG. 2B, information 218(1) includes that text strings "/a/b/seg=10" and "/a/b/seg=50," referring to the start 226 (1) and end 228(1) times of the current production window 224(1). As such, reusable NACK 212(1) may be applicable to any requests 210 for data that are outside the current production window 224(1) that arrive at server device 204 during the current production window 224(1), without having to recompute the signature 220(1).

Reusable NACK 212(1) may serve to provide helpful information to user device 206(1). User device 206(1) may use signature 220(1) of reusable NACK 212(1) to verify that reusable NACK 212(1) was generated by the correct server device (server device 204 in this case), as a method of authentication. Note that the "a/b" portion of the information 218(1) may be viewed as providing additional security and/or integrity to the header 214(1) in this case. For instance, even though the signature 220(1) does not cover the header 214(1), the "a/b" portion of the information 218(1) may serve to describe the requests 210 for which the payload 216(1) may be used as a reply. Thus, the "a/b" portion of the information 218(1) may prevent misuse of the payload 216(1) by an adversarial entity. User device 206(1) may also be able to verify from reusable NACK 212(1) that the requested portion of data (segment 5) is outside the production window 224(1). In some examples, the user device 206(1) may be able to declare that the reusable NACK 212(1) is valid, such as an instance where the above checks succeed. In other examples, reusable NACK 212(1) may serve to inform user device 206(1) of data that are currently available. Thus, user device 206(1) may be able to learn to cease requests for unavailable data. Additionally or alternatively, user device 206(1) may be able to estimate a time to repeat a request or generate a future request for data that may become available. The example representation of reusable NACK 212(1) in FIG. 2B is not meant to be limiting. Other versions of information 218 and/or content of headers 214 or payloads 216 of reusable NACKs 212 are contemplated.

As illustrated in FIGS. 2C and 2D, server device 204 may receive a request 210(2) from user device 206(2) at "Step 3." Request 210(2) may refer to segment 56, while production window 224(1) may be the same (segments 10-50) as in the instance of FIGS. 2A and 2B. In this case, server device 204 may determine that request 210(2) refers to data that are outside the production window 224(1), as indicated at arrow 230. Server device 204 may also determine that reusable NACK 212(1) applies, since the production window 224(1) has not changed. Therefore, server device 204 may update or replace header 214(2) and send reusable NACK 212(1) to user device 206(2) at "Step 4."

As illustrated in FIGS. 2E and 2F, server device 204 may further receive a request 210(3) from user device 206(3) at "Step 5." Request 210(3) may refer to segment 56, while production window 224(2) may have changed relative to the examples in FIGS. 2A-2D. As shown in FIG. 2F, the current production window corresponds to segments 12-52. In this case, server device 204 may determine that request 210(3) refers to data (segment 56) that are outside the production window 224(2), as indicated at arrow 230. Server device 204 may determine that reusable NACK 212(1) no longer applies. Server device 204 may generate a new reusable NACK 212(2) with information 218(2) pertinent to the current production window 224(2), and with a new signature 220(2), constituting a new payload 216(2). Server device 204 may update or replace header 214(3) and send reusable NACK 212(2) to user device 206(3) at "Step 6." Note that in some examples, a new reusable NACK 212 may be precomputed in anticipation of a production window advancing.

In some cases, a reusable NACK may be viewed as having a validity time in real-time scenarios. The validity time may be an amount of time that the reusable NACK is valid. For example, referring to the example in FIGS. 2A-2F, as data production advances along sequence 222, reusable NACKs will become invalid. Reusable NACK 212(1) is invalid for the instance depicted in FIG. 2F, since the production window 224(2) has advanced. However, some amount of overlap may be allowable. For instance, a production window of segments 11-51 may be close enough to the production window 224(1), relating to segments 10-50, that reusable NACK 212(1) may be considered still valid. Rather than having to update the reusable NACK 212 every time the production window advances by a single segment, for example, it may be advantageous to save computational resources at the server device by using the existing reusable NACK 212 past a theoretical expiration time. Therefore, the validity time of a reusable NACK may be a trade-off between an amount of work at the server device to produce a new reusable NACK and any loss experienced through a loss of synchronization between the server device and user devices. Stated another way, reusing the payload for a short time may correspond to fast and/or up-to-date synchronization between network devices (the start value is always updated), but may also mean more load on the server device. Conversely, allowing the payload to be reused longer means less work for the server device, but this approach may introduce some latency to a synchronization mechanism (if the start value is stale).

In some cases, a transport protocol (e.g., RICTP) may lessen potential synchronization problems described above. For example, the following example is applicable to RICTP, which uses an exponential growing production window in a synchronization phase. A server device may have a production rate of 1.72 Mbps (million bytes per second), which equates to 180 packets per second or one packet every 5.5 milliseconds (assuming 1200 bytes per packet). This production rate may have real-world applicability, as it may relate to a (potentially) minimum bandwidth required to deliver video at 1080p 30 fps, for instance. In this example, the production window may shift one segment (e.g., packet) every 5.5 milliseconds. However, a validity time of 10 milliseconds may have potentially no impact on the synchronization mechanism of RICTP, since 10 milliseconds corresponds to approximately two packets-worth of time. In this case, a start value in a reusable NACK may be wrong (e.g., stale) for, at most, one packet. By using a window of only two packets, the user device can get the right packet in only one round-trip time (RTT). The cost of a signature to the server device may be approximately 0.1 milliseconds. Therefore, updating the payload of a reusable NACK every 10 milliseconds may increase the computational load at the server device by only around 1%.

To summarize, the reusable acknowledgement techniques described herein may improve network performance. The techniques may be relatively lightweight, featuring low computational cost and/or low bandwidth usage. The techniques may help prevent denial-of-service type attacks on server devices and/or routers. Furthermore, the benefits of reusable acknowledgement techniques may be enjoyed while preserving data-authentication procedures and/or the integrity of communications between network devices.

Figure 3A:
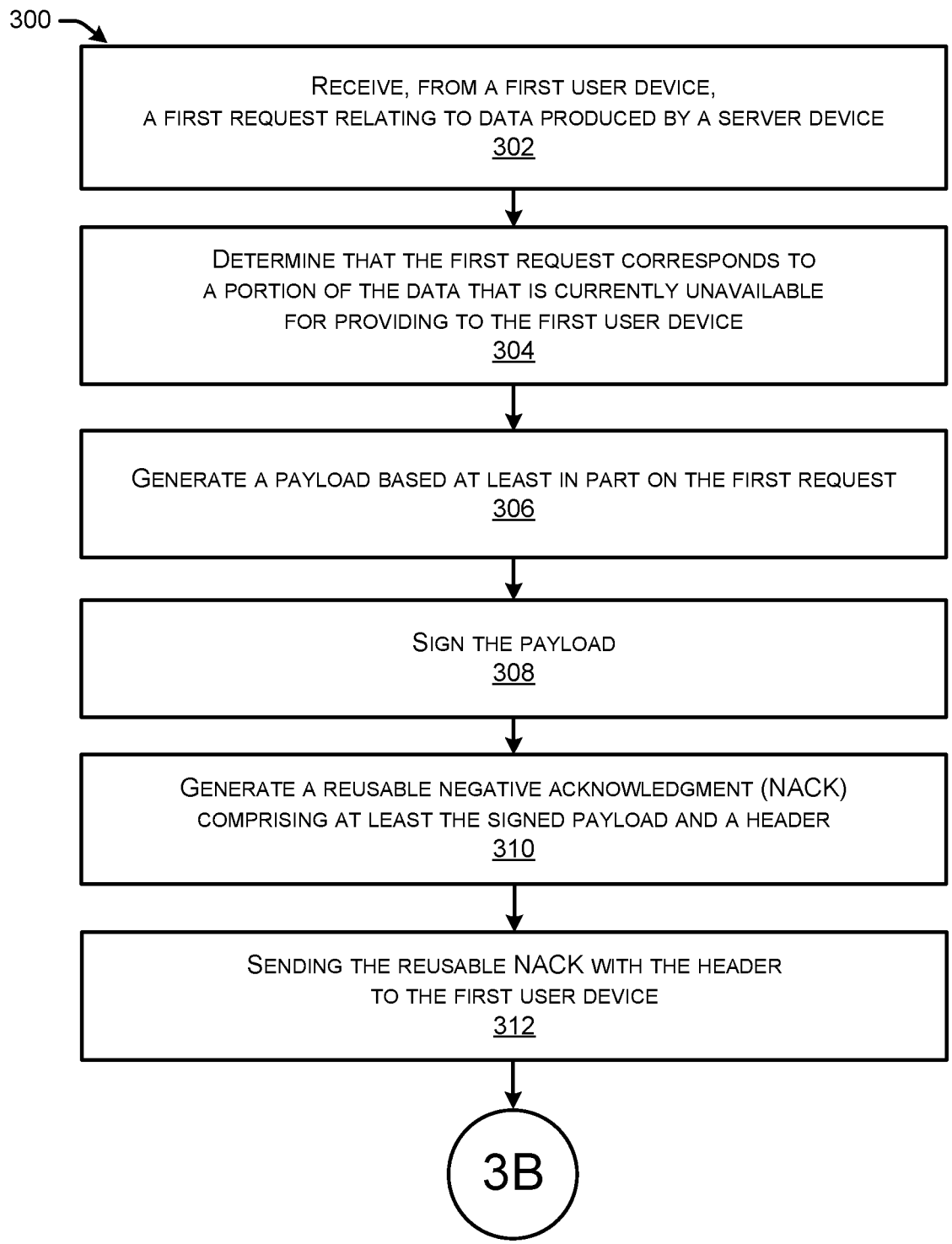
FIGS. 3A-5 illustrate flow diagrams of example methods for the use of reusable acknowledgments as a part of communications among network devices, in accordance with the present concepts.
Figure 3B:
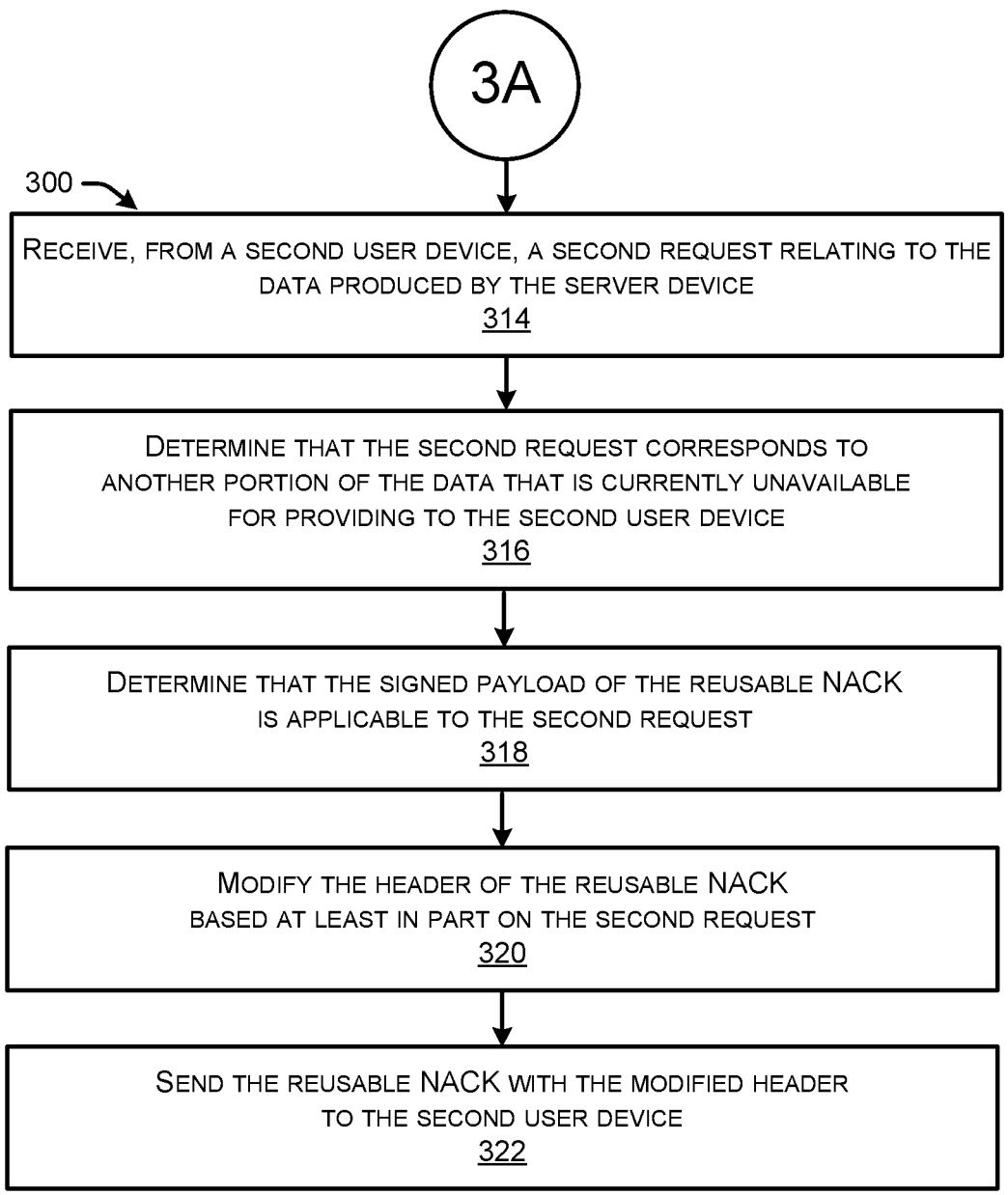
Figure 4:
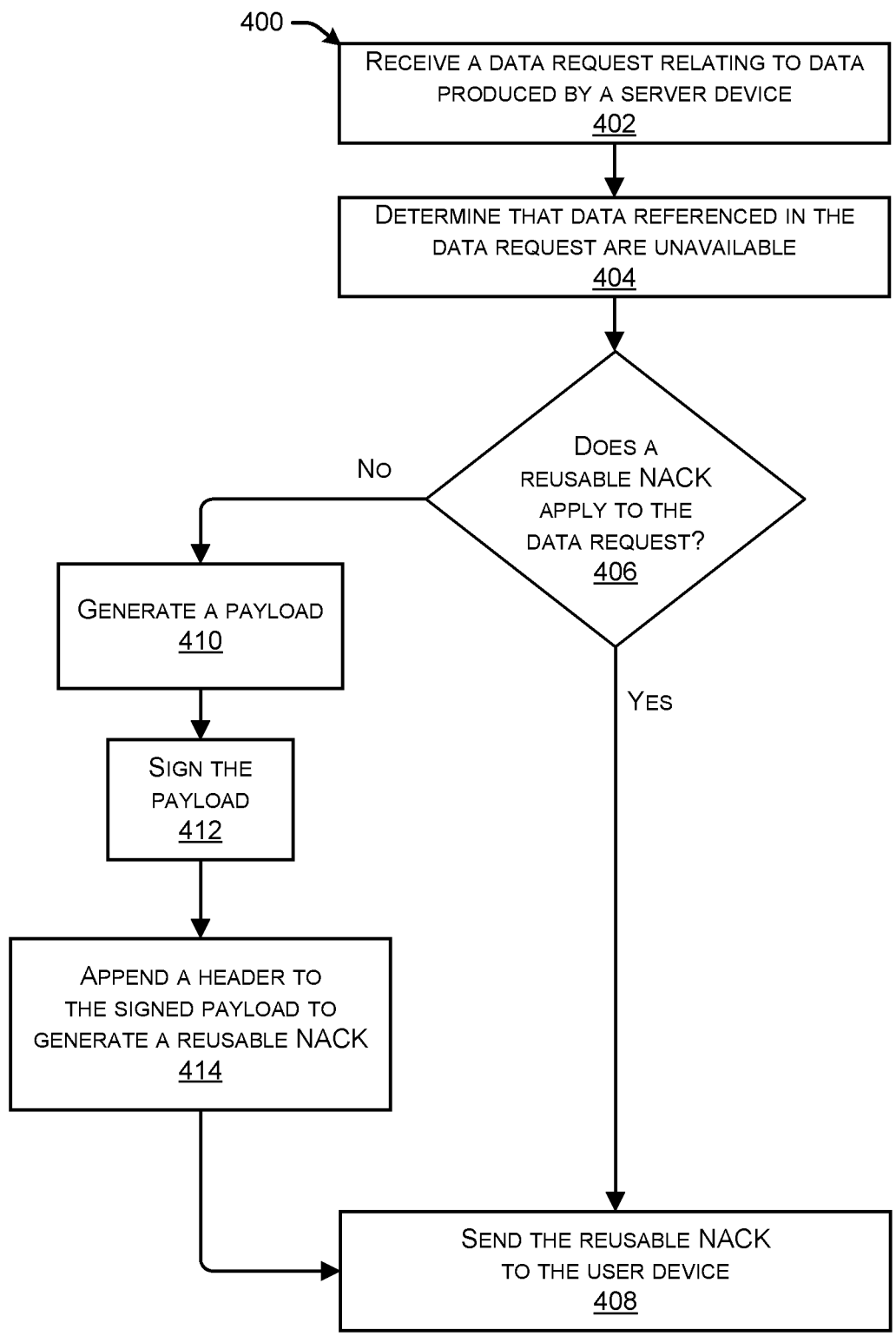

FIGS. 3 and 4 illustrate flow diagrams of example methods 300 and 400 that include functions that may be performed at least partly by a network device, such as server devices 104 or 204 described relative to FIGS. 1A-2F. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3 and 4 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIGS. 3A and 3B collectively illustrate a flow diagram of an example method 300 for network devices to perform reusable acknowledgment techniques. Method 300 may be performed by a server device (e.g., server device 104 or 204) communicatively coupled to a first and second user devices (e.g., user devices 106 or 206), for instance. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include receiving, from the first user device, a first request relating to data produced by the server device. For instance, the first request may reference data that the first user device expects are available from the server device.

At 304, method 300 may include determining that the first request corresponds to a portion of the data that is currently unavailable for providing to the first user device. For example, the server device may determine that the portion of the data is not currently present at the server device for providing to the first user device.

At 306, method 300 may include generating a payload based at least in part on the first request. In some examples, the server device may determine that the portion of the data is produced outside a current production window at the server device. In this case, the server device may generate the payload by including an indication of the current production window with the payload.

At 308, method 300 may include signing the payload. The payload may be signed with a private key of the server device. Signing the payload may be viewed as part of a data authentication technique or mechanism.

At 310, method 300 may include generating a reusable NACK comprising at least the signed payload and a header. In some examples, the header may have been received from the first user device as at least a part of the first request. The header may include at least a first identifier relating to the first user device, a second identifier relating to the server device, and/or an indication of the portion of the data requested in the first request, for instance.

At 312, method 300 may include sending the reusable NACK with the header to the first user device. The reusable NACK may be sent in response to the first request.

At 314, method 300 may include receiving, from the second user device, a second request relating to the data produced by the server device.

At 316, method 300 may include determining that the second request corresponds to another portion of the data that is currently unavailable for providing to the second user device. The first and second requests may correspond to the same or different portions of the data produced by the server device. Note that the first and/or second request may refer to data that were never, and never will be available at or from the server device.

At 318, method 300 may include determining that the signed payload of the reusable NACK is applicable to the second request. A determination that the signed payload is applicable may be based at least in part on the indication of the current production window in the signed payload. For instance, the server device may determine that the current production window indicated in the signed payload is still current and/or valid.

At 320, method 300 may include modifying the header of the reusable NACK based at least in part on the second request. The modified header may include at least a third identifier relating to the second user device and the second identifier relating to the server device, for instance.

At 322, method 300 may include sending the reusable NACK with the modified header to the second user device. The reusable NACK may be sent in response to the second request. The reusable NACK may also be sent to future additional requests. For example, method 300 may further include receiving, from a third user device, a third request relating to the data produced by the server device. The server device may determine that the third request corresponds to yet another portion of the data that is currently unavailable for providing to the third user device. The server device may determine that the signed payload of the reusable NACK is not applicable to the third request. Further, the server device may generate a new renewable NACK based at least in part on the determining that the signed payload of the reusable NACK is not applicable. Finally, the server device may send the new reusable NACK to the third user device.

FIG. 4 illustrates a flow diagram of an example method 400 for network devices to perform reusable acknowledgment techniques. Method 400 may be performed by a server device (e.g., server device 104 or 204) communicatively coupled to a user devices (e.g., user devices 106 or 206), for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving a data request relating to data produced by the server device. The data request may be received at the server device from a user device.

At 404, method 400 may include determining that data referenced in the data request are unavailable. For example, the server device may determine that the data are not currently present at the server device for providing to the user device.

At 406, method 400 may include determining whether a reusable NACK applies to the data request. The reusable NACK may have been created in response to a previous request for data produced by the server device, for instance. The reusable NACK may apply to a current production window at the server device, and therefore may apply to and/or be a valid response to the data request. In this instance, method 400 may proceed to 408. Alternatively, the reusable NACK may no longer apply to a current production window at the server device, and therefore may be invalid as a response to the data request. In this instance, method 400 may proceed to 410.

At 408, method 400 may include sending the reusable NACK to the user device.

At 410, method 400 may include generating a payload. The payload may be a static payload for a reusable NACK. The payload may refer to the current production window at the server device. The payload may be generated by updating a previous payload from a reusable NACK that is no longer valid.

At 412, method 400 may include signing the payload. The payload may be signed with a private key of the server device.

At 414, method 400 may include appending a header to the signed payload to generate a reusable NACK. In some examples, the reusable NACK may be an updated reusable NACK as compared to the reusable NACK at Step 406 of method 400. Upon generation of the reusable NACK, method 400 may proceed to Step 408, sending the (updated) reusable NACK from Step 414 to the user device.

Figure 5:
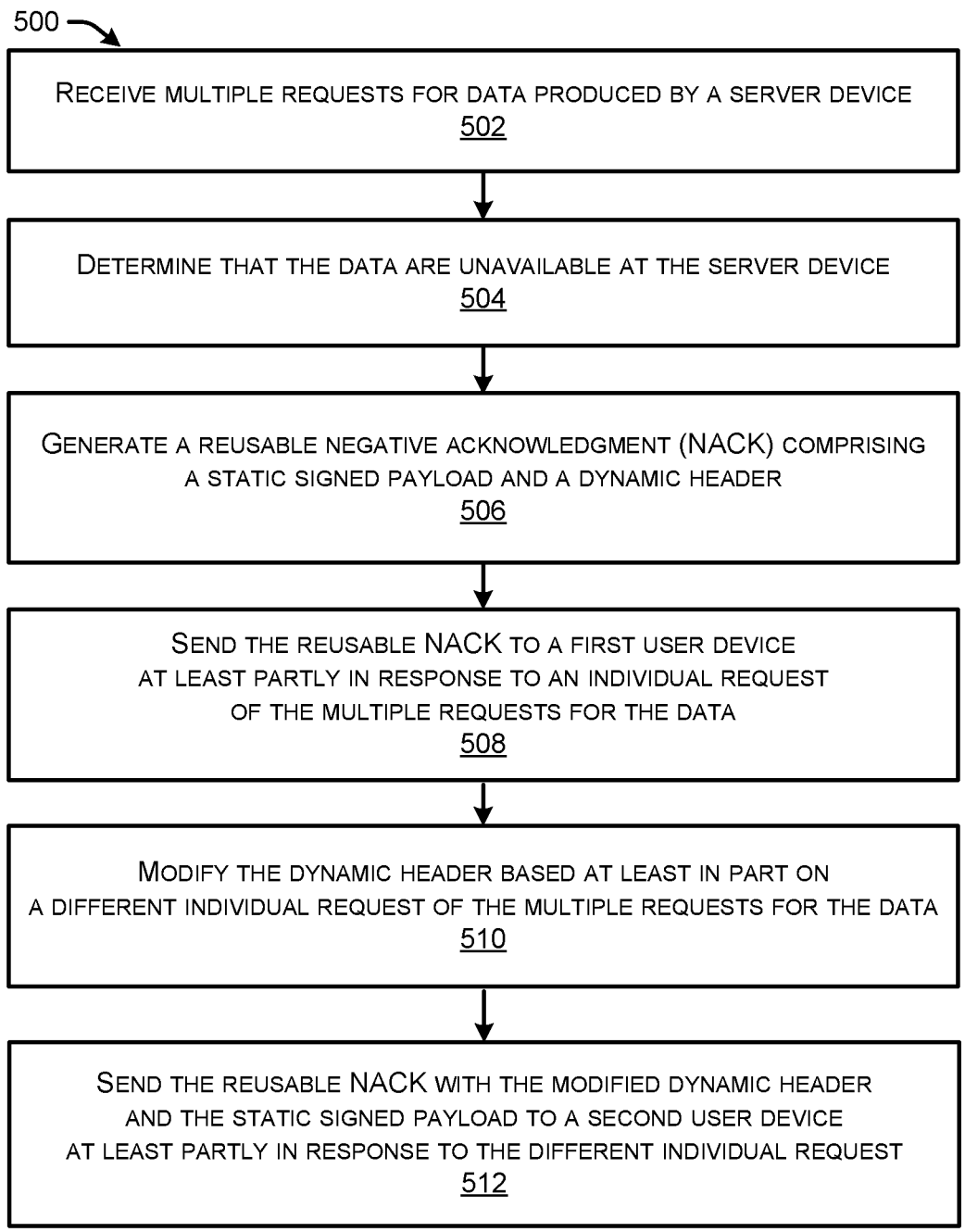

FIG. 5 illustrates a flow diagram of an example method 500 for network devices to perform reusable acknowledgment techniques. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may include receiving multiple requests for data produced by a server device (e.g., server device 104 or 204). The multiple requests may come from one or more other network devices (e.g., a user device).

At 504, method 500 may include determining that the data are unavailable at the server device. The data may have expired, may not have been produced yet, or will never be produced at the server device.

At 506, method 500 may include generating a reusable NACK comprising a static signed payload and a dynamic header. In some examples, the dynamic header may include an indication of the data that are unavailable at the server device. For instance, the dynamic header may indicate the data that were requested, but were determined to be currently unavailable. In some examples, the static signed payload may include an indication of available data at the server device. For instance, the indication may refer to a current production window at the server device. Further, the production window may be associated with a real-time transport protocol.

At 508, method 500 may include sending the reusable NACK to a first user device (e.g., user device 106 or 206) at least partly in response to an individual request of the multiple requests for the data. Method 500 may be performed by a server device (e.g., server device 104 or 204) communicatively coupled to a first and second user devices (e.g., user devices 106 or 206), for instance.

At 510, method 500 may include modifying the dynamic header based at least in part on a different individual request of the multiple requests for the data. The modification may include information relating to the data referenced in the different individual request.

At 512, method 500 may include sending the reusable NACK with the modified dynamic header and the static signed payload to a second user device at least partly in response to the different individual request.

Figure 6:
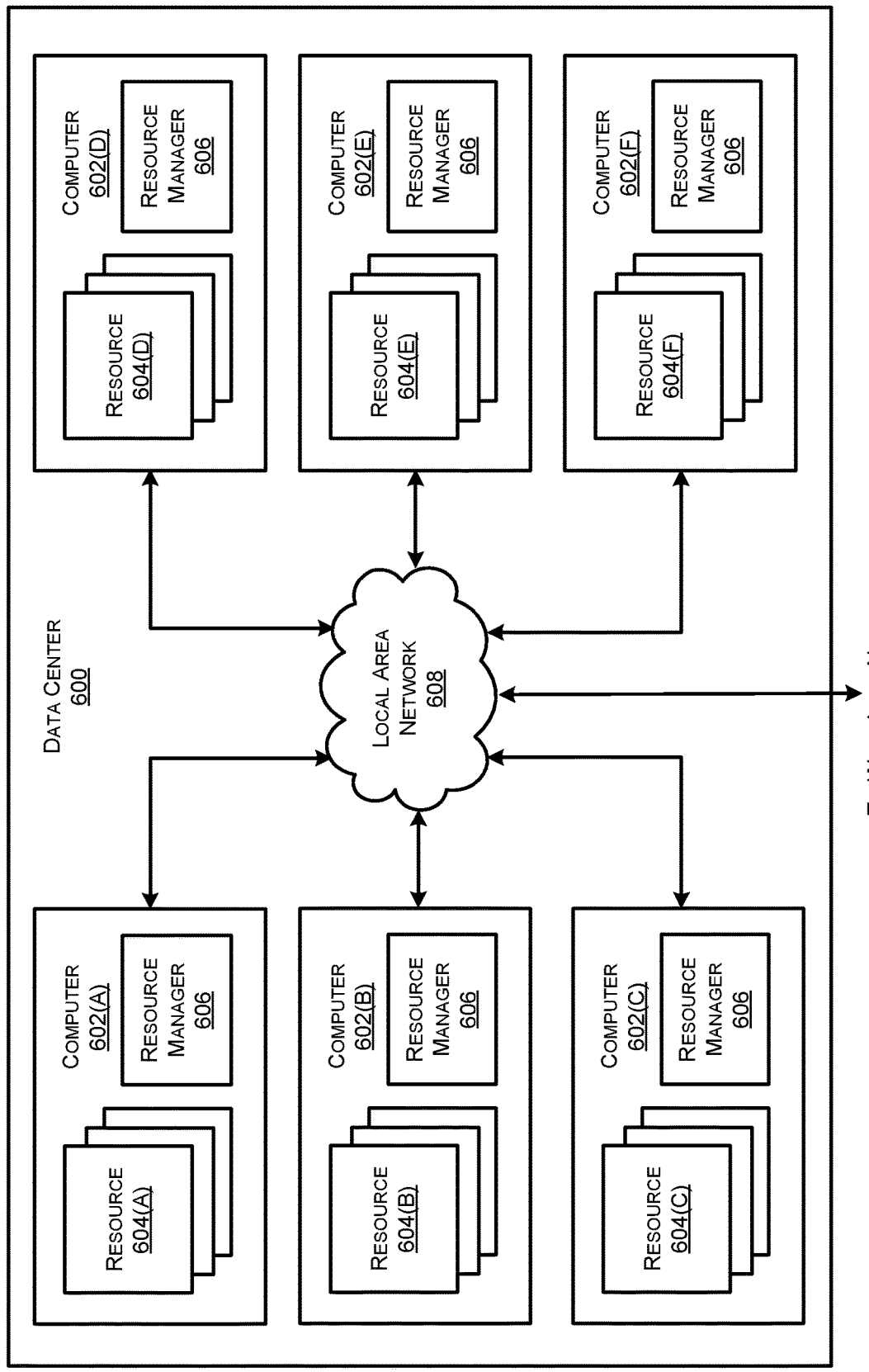
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as a server device (104 or 204) and/or user device (106 or 206). Although, computers 602 may comprise any type of networked device, such as servers, switches, routers, hubs, bridges, gateways, modems, repeaters, access points, hosts, etc.

The computers 602 can be standard tower, rack-mount, or blade server computers configured appropriately for providing computing resources. In some examples, the computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 602. Computers 602 in the data center 600 can also be configured to provide network services and other types of services.

In the example data center 600 shown in FIG. 6, an appropriate local area network (LAN) 608 is also utilized to interconnect the computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the computers 602A-602F in each data center 600, and, potentially, between computing resources in each of the computers 602. It should be appreciated that the configuration of the data center 600 described with reference to FIG. 6 is merely illustrative and that other implementations can be utilized.

In some examples, the computers 602 may each execute one or more application containers and/or virtual machines to perform techniques described herein. For instance, the containers and/or virtual machines may serve as server devices, user devices, and/or routers in the cloud computing network 102 or 202.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
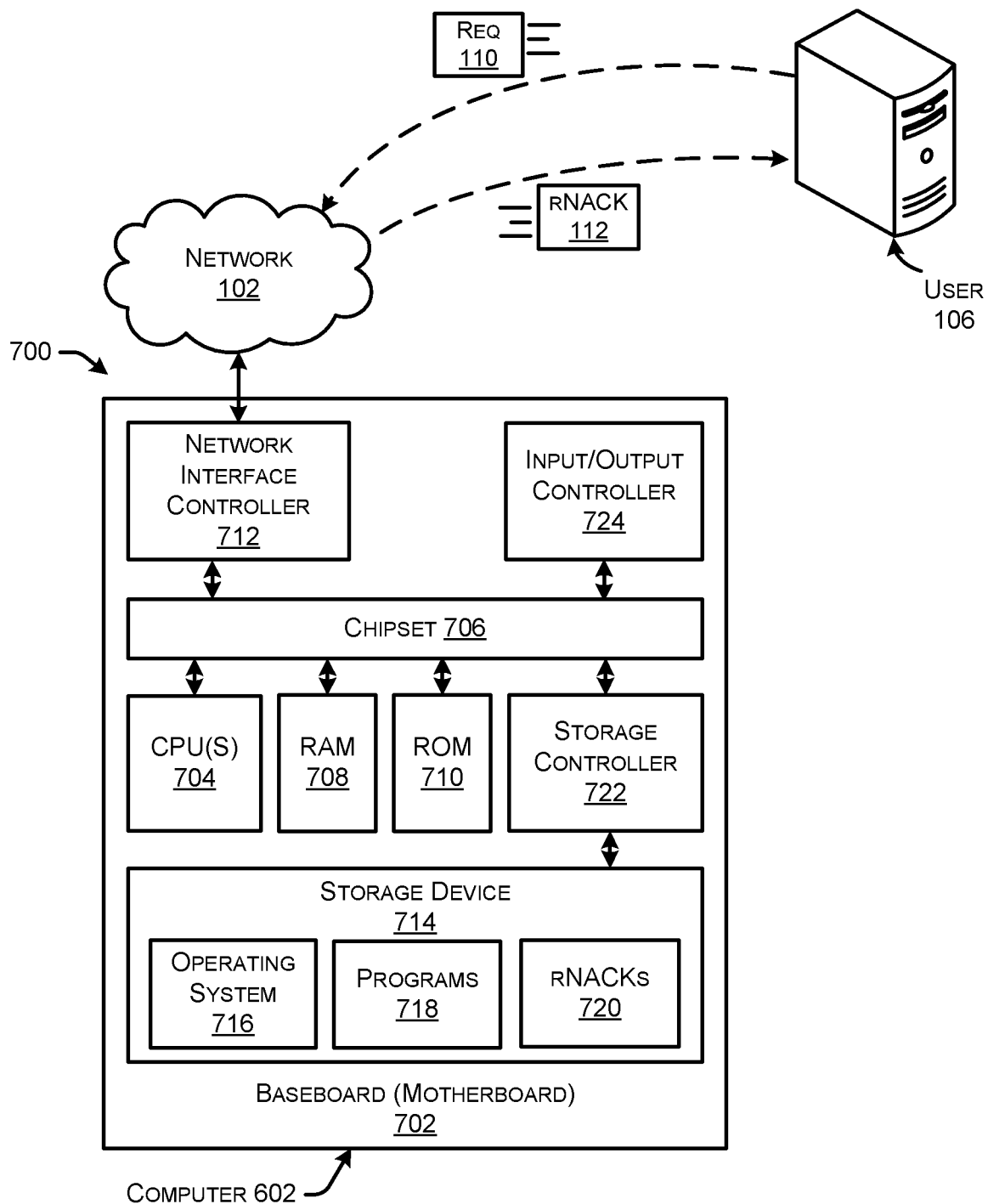
FIG. 7 is a computer architecture diagram showing an illustrative computer hardware architecture for implementing a device that can be utilized to implement aspects of the various technologies presented herein.

FIG. 7 shows an example computer architecture 700 for a computer 602 capable of executing program components for implementing the functionality described above. The computer architecture 700 shown in FIG. 7 illustrates a conventional server computer, workstation, desktop computer, laptop, tablet, network appliance, e-reader, smartphone, and/or other computing device, and can be utilized to execute any of the software components presented herein. The computer 602 may, in some examples, correspond to a physical device described herein (e.g., server device, user device, router, etc.), and may comprise networked devices such as servers, switches, routers, hubs, bridges, gateways, modems, repeaters, access points, etc. For instance, computer 602 may correspond to server device 104 or 204.

As shown in FIG. 7, the computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the networks 102, 202, and/or 608. The chipset 706 can include functionality for providing network connectivity through a network interface controller (NIC) 712, such as a gigabit Ethernet adapter. The NIC 712 is capable of connecting the computer 602 to other computing devices over the network 102. For instance, in the example shown in FIG. 7, NIC 712 may help facilitate transfer of data, packets, and/or communications, such as requests 110 and/or reusable NACKs 112, over the network 102 with user device 106. It should be appreciated that multiple NICs 712 can be present in the computer 602, connecting the computer to other types of networks and remote computer systems.

The computer 602 can be connected to a storage device 714 that provides non-volatile storage for the computer. The storage device 714 can store an operating system 716, programs 718, reusable NACKs 720, and/or other data. The storage device 714 can be connected to the computer 602 through a storage controller 722 connected to the chipset 706, for example. The storage device 714 can consist of one or more physical storage units. The storage controller 722 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 714 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 714 is characterized as primary or secondary storage, and the like.

For example, the computer 602 can store information to the storage device 714 by issuing instructions through the storage controller 722 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 714 by detecting the physical states or characteristics of one or more particular locations within the physical storage units.

In addition to the mass storage device 714 described above, the computer 602 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 602. In some examples, the operations performed by the network 102, and or any components included therein, may be supported by one or more devices similar to computer 602. Stated otherwise, some or all of the operations performed by the network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 714 can store an operating system 716 utilized to control the operation of the computer 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 714 can store other system or application programs and data utilized by the computer 602.

In one embodiment, the storage device 714 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 402 has access to computer-readable storage media storing computer-executable instructions which, when executed by the computer 602, perform the various processes described above with regard to FIGS. 1A-5. The computer 602 can also include computer-readable storage media having instructions stored thereupon for performing any of the other computer-implemented operations described herein.

The computer 602 can also include one or more input/output controllers 724 for receiving and processing input from a number of input devices, such as a keyboard, a mouse, a touchpad, a touch screen, an electronic stylus, or other type of input device. Similarly, an input/output controller 724 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

As described herein, the computer 602 may comprise one or more devices, such as server device 104 or 204, user devices 106 or 206, and/or other devices. The computer 602 may include one or more hardware processors 704 (processors) configured to execute one or more stored instructions. The processor(s) 704 may comprise one or more cores. Further, the computer 602 may include one or more network interfaces configured to provide communications between the computer 602 and other devices, such as the communications described herein as being performed by server device 104 and 106 and user devices 106 and 206, and/or other devices. In some examples, the communications may include data, packet, request, acknowledgment, reusable NACK, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 718 may comprise any type of programs or processes to perform the techniques described in this disclosure in accordance with reusable acknowledgement techniques. For instance, the programs 718 may cause the computer 602 to perform techniques for communicating with other devices using any type of protocol or standard usable for determining connectivity. Also, programs 718 may comprise instructions that cause computer 602 to perform the specific techniques for the employment of reusable acknowledgments.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a server device communicatively coupled to a first user device and a second user device, the method comprising:
   receiving, from the first user device, a first request relating to data produced by the server device;
   determining that the first request corresponds to a portion of the data that is currently unavailable for providing to the first user device;
   generating a payload based at least in part on the first request;

signing the payload;
generating a reusable negative acknowledgment (NACK) comprising at least the signed payload and a header;
sending the reusable NACK with the header to the first user device;
receiving, from the second user device, a second request relating to the data produced by the server device;
determining that the second request corresponds to another portion of the data that is currently unavailable for providing to the second user device;
determining that the signed payload of the reusable NACK is applicable to the second request;
modifying the header of the reusable NACK based at least in part on the second request; and
sending the reusable NACK with the modified header to the second user device.

2. The method of claim 1, wherein the header is received from the first user device as at least a part of the first request.

3. The method of claim 2, wherein the header comprises at least a first identifier relating to the first user device, a second identifier relating to the server device, and an indication of the portion of the data requested in the first request.

4. The method of claim 3, wherein the modified header comprises at least a third identifier relating to the second user device and the second identifier relating to the server device.

5. The method of claim 1, wherein the determining that the portion of the data is currently unavailable at the server device comprises determining that the portion of the data is not currently present at the server device for providing to the first user device.

6. The method of claim 1, wherein the generating the payload further comprises:
determining that the portion of the data is produced outside a current production window at the server device; and
generating the payload to comprise an indication of the current production window.

7. The method of claim 6, wherein the determining that the signed payload of the reusable NACK is applicable to the second request is based at least in part on the indication of the current production window in the signed payload.

8. The method of claim 1, further comprising:
receiving, from a third user device, a third request relating to the data produced by the server device;
determining that the third request corresponds to yet another portion of the data that is currently unavailable for providing to the third user device;
determining that the signed payload of the reusable NACK is not applicable to the third request;
generating a new renewable NACK based at least in part on the determining that the signed payload of the reusable NACK is not applicable; and
sending the new reusable NACK to the third user device.

9. A server device comprising:
one or more processors; and
one or more non-transitory computer-readable media storing computer-executable instructions that, when executed by the one or more processors, cause the one or more processors to:
receive, from a first user device, a first request relating to data produced by the server device;
determine that the first request corresponds to a portion of the data that is currently unavailable for providing to the first user device;
generate a payload based at least in part on the first request;
sign the payload;
generate a reusable negative acknowledgment (NACK) comprising at least the signed payload and a header;
send the reusable NACK with the header to the first user device;
receive, from the second user device, a second request relating to the data produced by the server device;
determine that the second request corresponds to another portion of the data that is currently unavailable for providing to the second user device;
determine that the signed payload of the reusable NACK is applicable to the second request;
modify the header of the reusable NACK based at least in part on the second request; and
send the reusable NACK with the modified header to the second user device.

10. The server device of claim 9, wherein the header is received from the first user device as at least a part of the first request.

11. The server device of claim 10, wherein the header comprises at least a first identifier relating to the first user device, a second identifier relating to the server device, and an indication of the portion of the data requested in the first request.

12. The server device of claim 9, wherein the modified header comprises at least a third identifier relating to the second user device and the second identifier relating to the server device.

13. The server device of claim 9, wherein the determining that the portion of the data is currently unavailable at the server device comprises determining that the portion of the data is not currently present at the server device for providing to the first user device.

14. The server device of claim 9, wherein the computer-executable instructions further cause the one or more processors to:
determine that the portion of the data is produced outside a current production window at the server device; and
generate the payload to comprise an indication of the current production window.

15. The server device of claim 14, wherein the determining that the signed payload of the reusable NACK is applicable to the second request is based at least in part on the indication of the current production window in the signed payload.

16. The server device of claim 9, wherein the computer-executable instructions further cause the one or more processors to:
receive, from a third user device, a third request relating to the data produced by the server device;
determine that the third request corresponds to yet another portion of the data that is currently unavailable for providing to the third user device;
determine that the signed payload of the reusable NACK is not applicable to the third request;
generate a new renewable NACK based at least in part on determining that the signed payload of the reusable NACK is not applicable; and
send the new reusable NACK to the third user device.

17. A method comprising:
receiving multiple requests for data produced by a server device;
determining that the data are unavailable at the server device;
generating a reusable negative acknowledgment (NACK) comprising a static signed payload and a dynamic header;

sending the reusable NACK to a first user device at least partly in response to an individual request of the multiple requests for the data;

modifying the dynamic header based at least in part on a different individual request of the multiple requests for the data; and sending the reusable NACK with the modified dynamic header and the static signed payload to a second user device at least partly in response to the different individual request.

18. The method of claim 17, further comprising:

generating the static signed payload of the reusable NACK by including an indication in the static signed payload of available data at the server device.

19. The method of claim 18, further comprising:

generating the static signed payload of the reusable NACK by including in the static signed payload an indication of a production window associated with a real-time transport protocol, wherein the production window corresponds to the available data.

20. The method of claim 17, further comprising:

generating the dynamic header of the reusable NACK by including an indication of the data that are unavailable at the server device.

* * * * *